(12) United States Patent
Basu et al.

(10) Patent No.: US 8,185,536 B2
(45) Date of Patent: May 22, 2012

(54) RANK-ORDER SERVICE PROVIDERS BASED ON DESIRED SERVICE PROPERTIES

(75) Inventors: Sujoy Basu, Sunnyvale, CA (US); Sharad Singhal, Belmont, CA (US); Sven Graupner, Mountain View, CA (US); Mehmet Kivanc Ozonat, Mountain View, CA (US); Donald E. Young, Portland, OR (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 372 days.

(21) Appl. No.: 12/363,698

(22) Filed: Jan. 30, 2009

(65) Prior Publication Data

US 2010/0198840 A1 Aug. 5, 2010

(51) Int. Cl.
*G06F 7/00* (2006.01)
(52) U.S. Cl. ...................................................... 707/749
(58) Field of Classification Search .................. 707/737, 707/777, 754, 748–74
See application file for complete search history.

(56) References Cited

U.S. PATENT DOCUMENTS

| 7,647,349 | B2* | 1/2010 | Hubert et al. | 707/999.107 |
|---|---|---|---|---|
| 2003/0097296 | A1* | 5/2003 | Putt | 705/11 |
| 2004/0133574 | A1* | 7/2004 | Bradford | 707/8 |
| 2005/0038697 | A1* | 2/2005 | Aaron | 705/14 |
| 2007/0185859 | A1* | 8/2007 | Flowers et al. | 707/5 |
| 2008/0005651 | A1* | 1/2008 | Grefenstette et al. | 715/500 |
| 2009/0327243 | A1* | 12/2009 | Pradhan et al. | 707/3 |

OTHER PUBLICATIONS

Dumais, Using Latent Semantic Anaylsis to Improve Access to Textual Information, 1988, pp. 281-285.
Basu, Service Selection in Business Service Ecosystem, pp. 1-14; Dec. 1, 2008.
Rosario, Latent Semantic Indexing: An Overiew, 2000, pp. 1-16.

* cited by examiner

*Primary Examiner* — Hung T Vy

(57) ABSTRACT

Candidate service providers for a desired service are ranked. Terms describing service requirements for a desired service are determined. Service capability documents describing the services of the candidate service providers are determined using the terms describing the service requirements. Using singular value decomposition (SVD) and a metric, similarities between the terms describing the service requirements and the service capability documents are determined. The candidate service providers are ranked based on the similarities.

20 Claims, 9 Drawing Sheets

RANK-ORDER SERVICE PROVIDERS BASED ON DESIRED SERVICE PROPERTIES

BACKGROUND

A world-wide community of service providers has a presence on the Internet, and people seeking services typically go to the Internet to search for service providers. For example, a person seeking printing services may search the Internet for service providers in their area. In another example, a business seeking to enter into a contract for shipping services may search the Internet for service providers to solicit bids.

Using a search engine to find service providers on the Internet that can potentially provide a desired service can be a difficult and time consuming task. Part of the reason for the difficulty is because there is no structured format followed by service providers for providing details on their services. The majority of service providers do not use a structured format or framework, and instead, provide information about their services on their web sites for a user to read. As a result, a user searching for service providers would have to visit each web site, read the content, and make a determination as to whether a service described at web site is the type of service the user desires.

BRIEF DESCRIPTION OF DRAWINGS

The embodiments of the invention will be described in detail in the following description with reference to the following figures.

DETAILED DESCRIPTION OF EMBODIMENTS

For simplicity and illustrative purposes, the principles of the embodiments are described by referring mainly to examples thereof. In the following description, numerous specific details are set forth in order to provide a thorough understanding of the embodiments. It will be apparent however, to one of ordinary skill in the art, that the embodiments may be practiced without limitation to these specific details. In some instances, well known methods and structures have not been described in detail so as not to unnecessarily obscure the embodiments.

A service as used herein includes the performance of any duties or work for another. The service may be provided over the Internet or may be provided through other means. Examples of services may include web hosting services, medical services, shipping services or any other type of service.

According to an embodiment, user input describing requirements for one or more desired services is provided in the form of documents, referred to as service description documents. Relevant terms describing service requirements are extracted from service description documents and are input to an Internet search engine. Service capability documents (e.g., HTML web pages, PDF documents, etc.) identified by the search engine results are retrieved from the Internet. These documents describe services provided by potential service providers for the desired services, referred to as candidate service providers. Text classification techniques may be used to identify services and service properties from the service capability documents. Candidate service providers are matched with desired services, and ranked based on the similarity of services provided to service requirements for desired services.

Figure 1A:
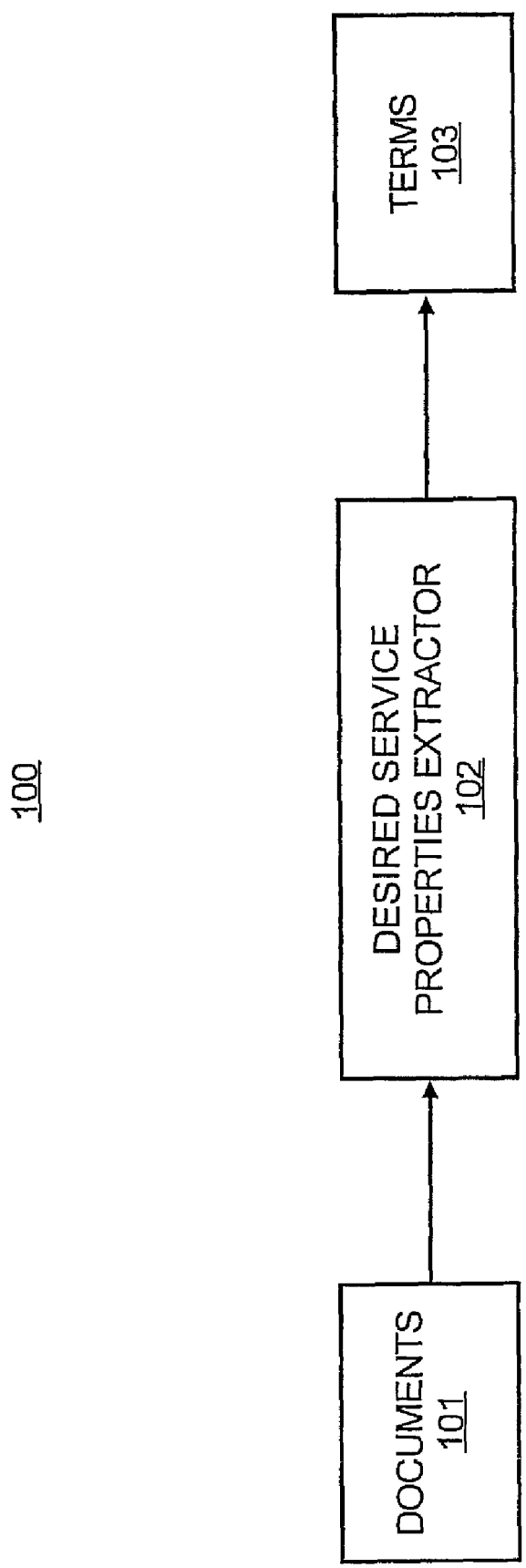
FIGS. 1A-D illustrates data flows and system components used to identify and rank service providers, according to an embodiment.

FIGS. 1A-D illustrate data flows and system components used to identify and rank service providers. FIG. 1A shows extracting a vector of significant terms from service requirements for a desired service. A document 101 includes a description of a desired service, i.e., a service description document. The document 101 may include the requirements for the desired service. In one example, the document 101 is a request for proposal (RFP). The document 101 may be a text document, a pdf document, or may be provided in another known format. A desired service properties extractor 102 receives the document 101 and extracts terms 103 that describe the properties of the desired service from the document 101. In one embodiment, the desired service properties extractor 102 uses singular value decomposition (SVD) to extract the terms 103 from the document 101. The terms 103 may exclude terms from a predetermined set of stop words, which have been previously identified as terms that are not significant.

Figure 1B:
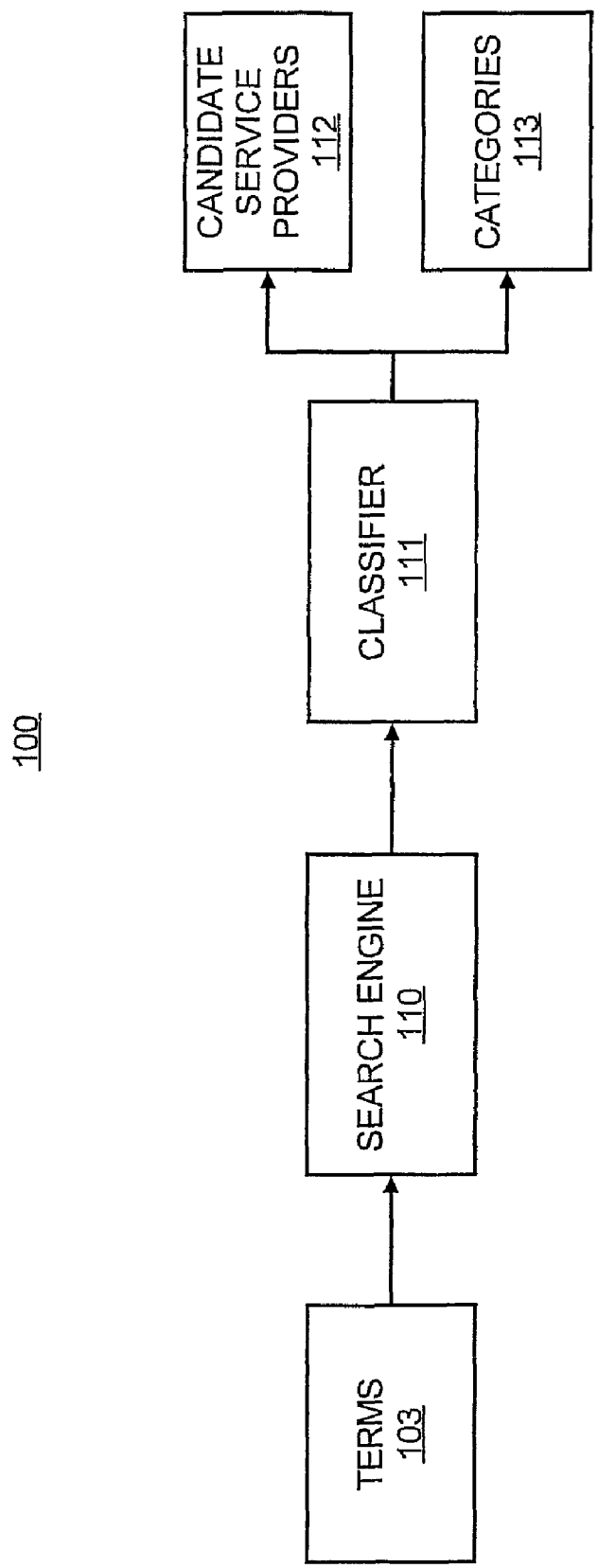

FIG. 1B shows identifying candidate service providers from the Internet. The terms 103 are input to a search engine 110, such as YAHOO or GOOGLE. The search results are provided to a classifier 111 to identify candidate service providers 112 that potentially can provide the desired service. In one embodiment, the classifier 111 can identify different categories of service providers 112 for different categories of desired services. For example, the document 101 may include multiple documents describing different categories of services. The classifier 111 identifies service provider candidates for each of the categories. Note that the search results provided from the search engine 110 to the classifier include service capability documents, such as html documents, text, or other content, extracted from web sites identified by the search engine 110. The classifier 111 then classifies this information into web content for candidate service providers 112 and categories 113.

Figure 1C:
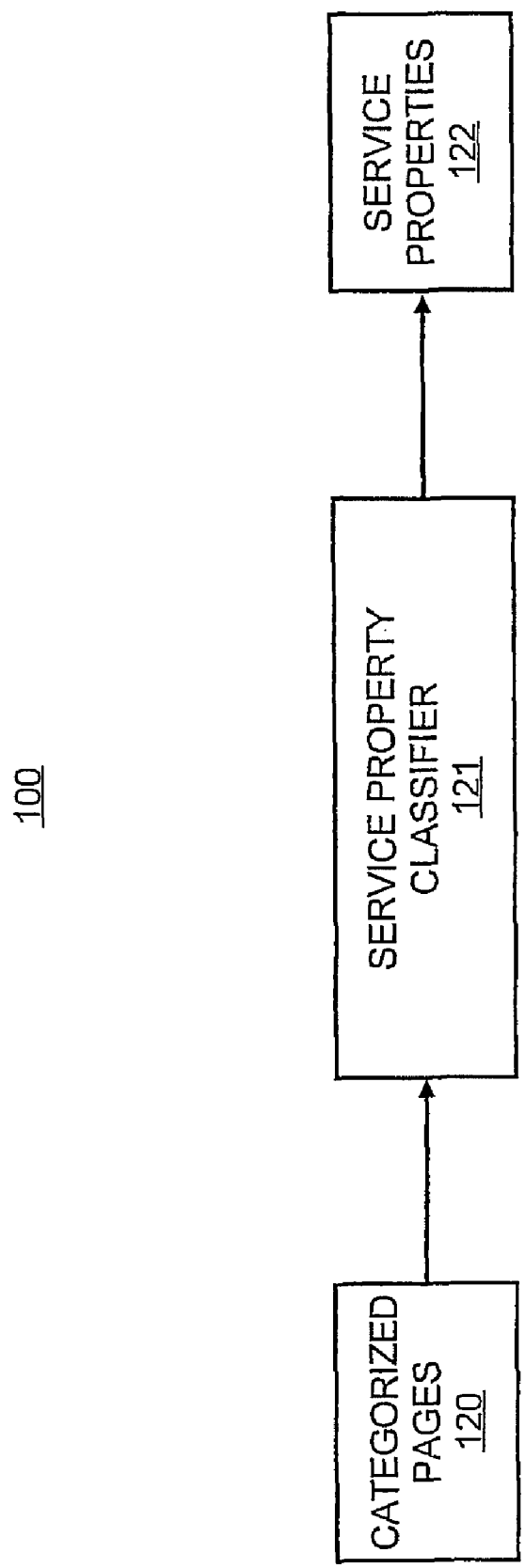

FIG. 1C shows extracting service properties from the web content including the service capability documents. Categorized pages 120 include the web content including the service capability documents for the candidate service providers 112 and categories 113. A service property classifier 121 identifies service properties 122 from the categorized pages 120. The service properties 122 may include terms from web pages that describe the services of candidate service providers.

Figure 1D:
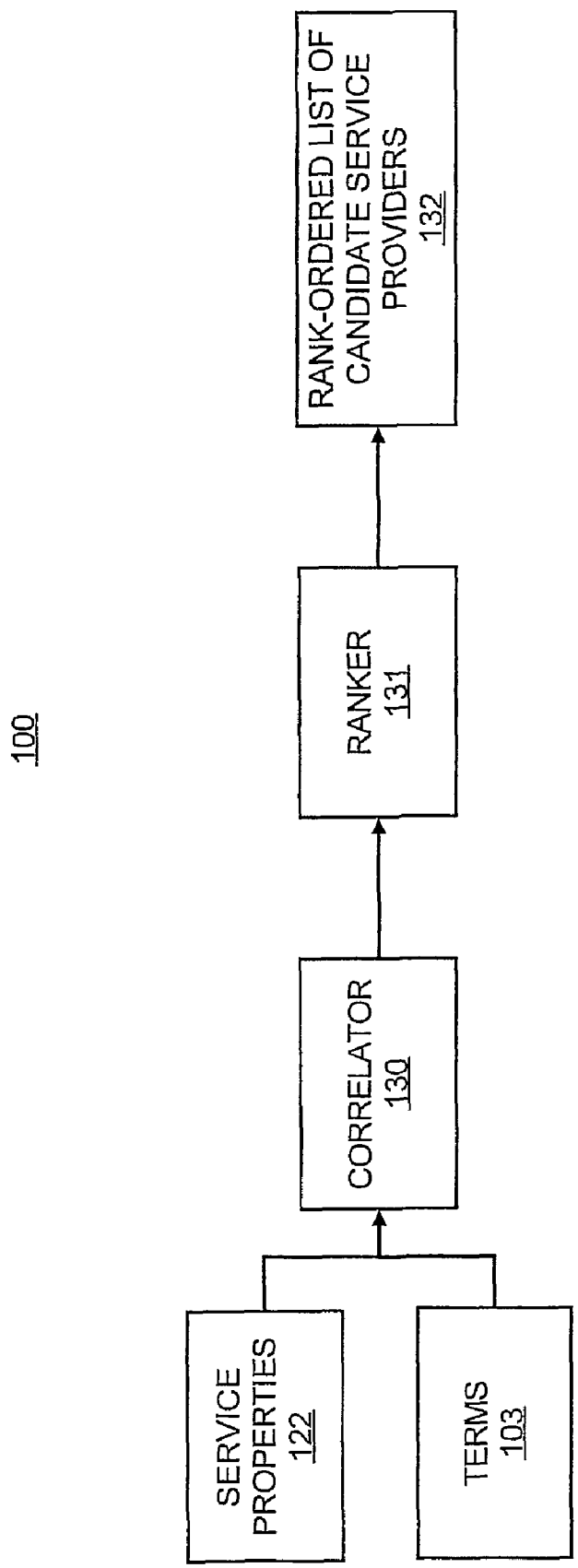

FIG. 1D shows correlating service requirements for a desired service with service properties. The service properties 122 and the terms 103, which may describe service requirements for the desired service, are provided to a correlator 130. The correlator 130 identifies particular service properties 122 that are relevant to the terms 103. From the identified service properties 122 that are relevant to the terms 103, candidate service providers are determined. For example, if a web page includes many of the terms 103, the service provider described in the web page may be selected as a candidate service provider. A ranker 131 ranks the candidate service providers according to criteria. A rank-ordered list 132 of candidate service providers are output by the ranker 131. In one embodiment, latent semantic indexing (LSI) is used to correlate the service properties 122 and the terms 103.

Figure 2:
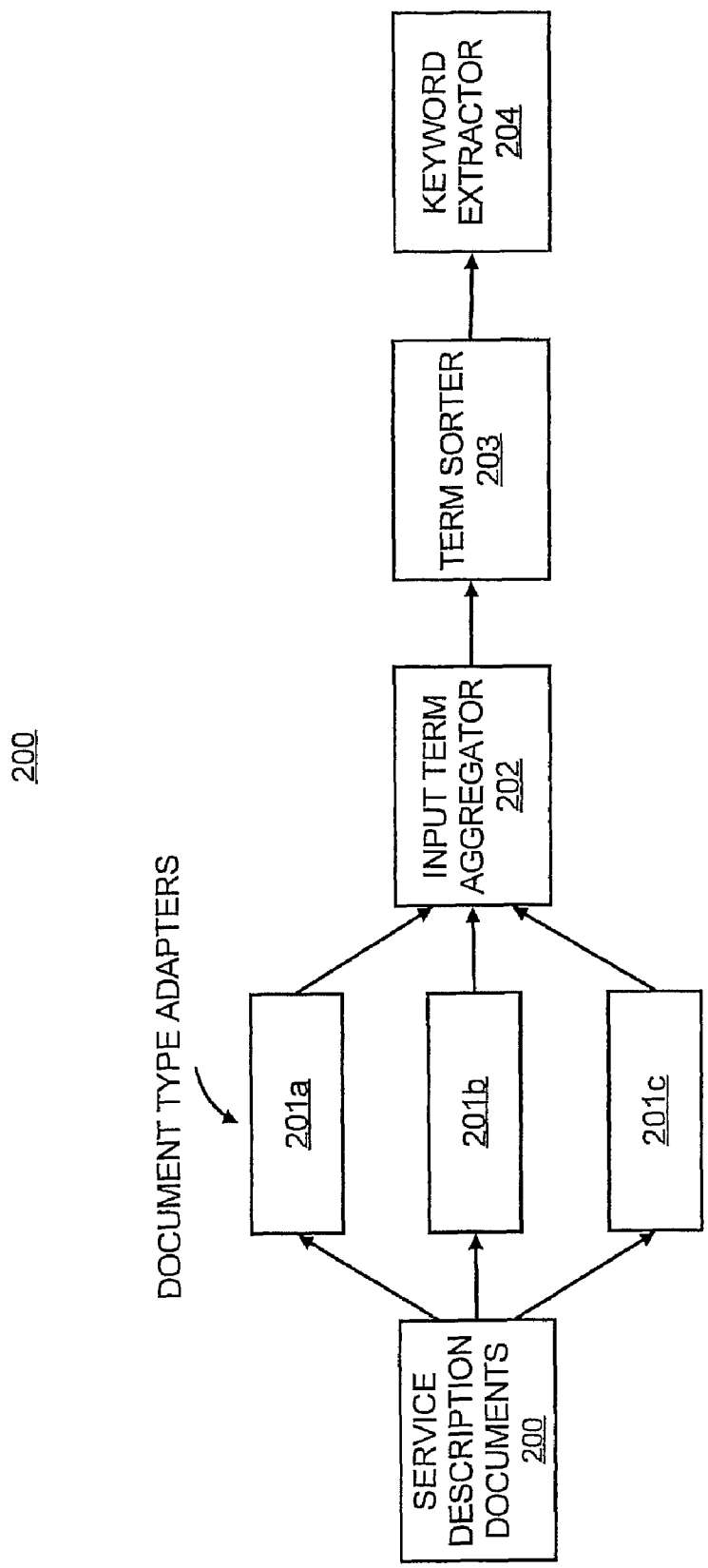
FIG. 2 illustrates a system for extracting terms from service description documents, according to an embodiment.

FIG. 2 illustrates a system 200 for extracting terms from service description documents, according to an embodiment. One or more of the components of the system 200 may be used for the desired service properties extractor 102 shown in FIG. 1A, according to an embodiment. The system 200 includes document type adaptors 201a-c, an input term aggregator 202, a term sorter 203, and a keyword extractor 204.

The documents 101 shown in FIG. 1A may include a set of service description documents 200 describing requirements for one or more desired services. The service description documents 200 may include machine readable electronic documents that exist in various formats and types and that are produced by people using a text processor, a spread sheet or other computer programs.

The document type adaptors 201a-c are able to open and read the documents 200 and produce output documents that are in a type-independent, normalized representation, such as ASCII text. A document type adaptor may be provided for each type of document. For example, document type adaptor 201a normalizes PDF documents. The document type adaptor 201b normalizes WORD documents, and the document type adaptor 201c normalizes EXCEL documents. The documents 200 may be normalized to ASCII text or some other generic format.

The input term aggregator 202 reads the normalized documents and extracts terms from the documents. The extracted terms are combined into a single data structure, such as a matrix X. For example, the matrix X is a term-by-document matrix where the rows represent the terms in each of the documents 200 and the columns represent the documents 200. In another embodiment, the matrix X has rows representing the documents and columns representing the terms. Each cell (row, column) then holds a binary value $\{0,1\}$ indicating that a term occurs in the document. In another embodiment the cell holds a non-negative integer indicating the frequency of the term in the document.

The terms extracted from the documents may be non-stop word terms. Stop words are words that may not be relevant to the subject matter of the document, such as "the" and "and". A list of predetermined stop-words in the language is used as a filter. All occurrences of these stopwords are removed from the document. The stop words and non-stop words may be predetermined based on language analysis. Also, the extracted terms may be a single word, bigrams or trigrams. A bigram is two words in a predetermined order and a trigram is three words in a predetermined order. The words in the bigrams and trigrams are words that are often used together, such as "sports car".

The term sorter 203 computes the relevance of the terms to the service descriptions of the documents 200. Steps performed by the term sorter and other system components are described in a method 300 below. The term sorter uses SVD to determine the most relevant terms from the matrix X. The term sorter 203 may generate a vector of terms ranked based on relevance. The relevance of each term may be the relevance of each term to one or more service descriptions and requirements in the documents 200.

The keyword extractor 204 extracts the terms from the vector generated by the terms sorter 203. The number of terms extracted may be based on a term relevance threshold for determining a set of the highest ranked terms. The extracted terms are then provided to the search engine 110 shown in FIG. 1B and are used to eventually determine the rank-ordered list of candidate service providers 132.

Figure 3:
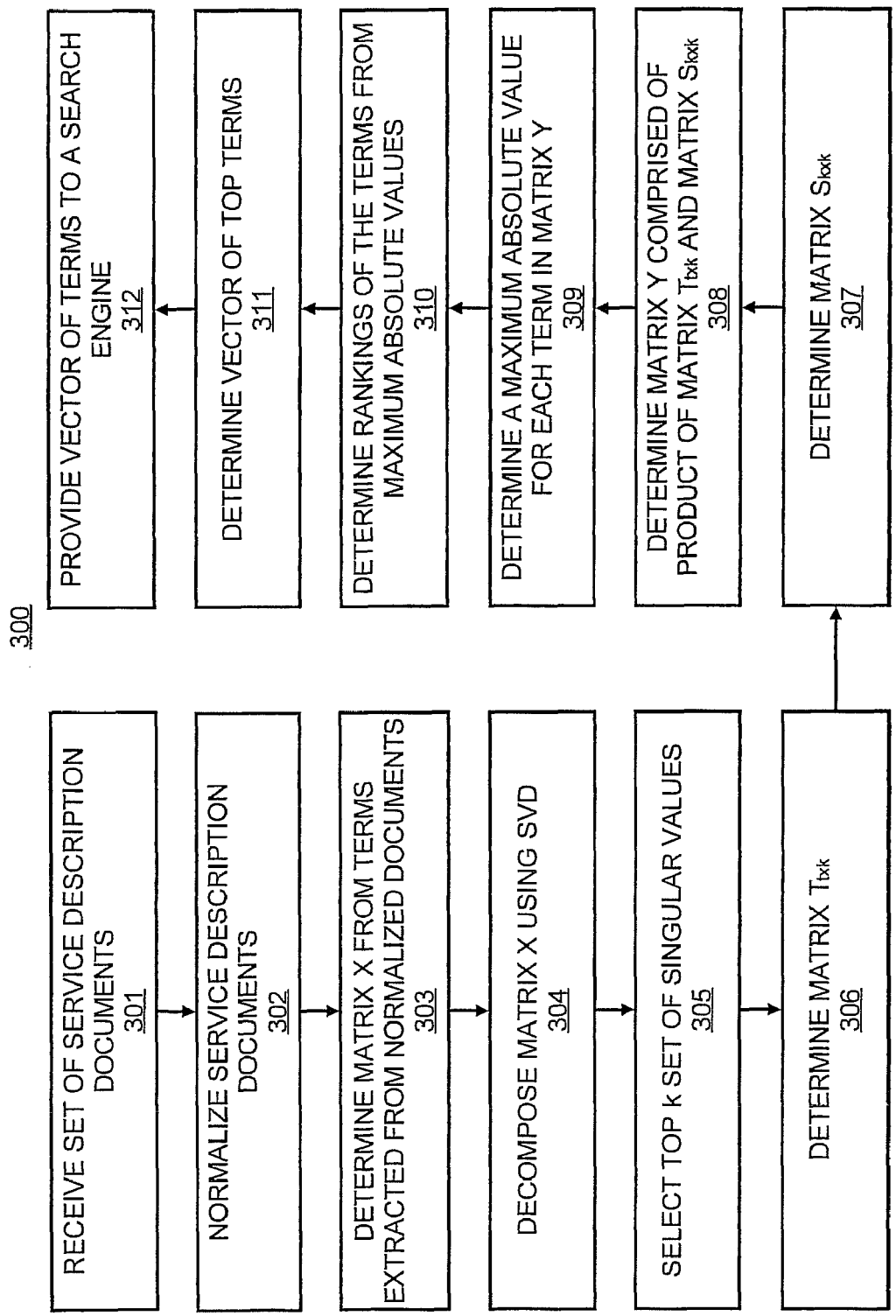
FIG. 3 illustrates a method for determining a vector of terms ranked based on relevance, according to an embodiment.

FIG. 3 describes a method 300 for determining a vector of terms ranked based on relevance, according to an embodiment. The method 300 is described with respect to FIGS. 1-2 by way of example and not limitation. At step 301, a set of service description documents are received. The set of service description documents may be the documents 200 that include one or more documents describing one or more desired services. The descriptions of desired services may include service requirements. A service description document may be a statement of work that is a form filled out by a person. For example, a SOW is created for a marketing campaign at a large customer event. A service provider is sought for printing brochures for the event.

At step 302, the service description documents 200 are normalized. Terms are extracted from normalized service description documents. The documents 200 are normalized to a generic format, such as ASCII text, and the non-stop words are extracted. Document-type adaptors shown in FIG. 2 may be used to normalize different types of service description documents. In one embodiment of step 302, each service description document is normalized as a complete document. In a second embodiment, each service document is partitioned into multiple documents, for example by section, before normalization.

At step 303, the matrix X is determined from terms extracted from the normalized documents. The terms extracted from the set of service description documents may be non-stop words, such as the following terms extracted from a marketing campaign SOW: "print quantity 2,000 colored 8.5×11 z-fold brochures, 100 lb. gloss within 10 days with maximum budget of $1,000". The input aggregator may be used to extract terms and create the matrix X. The matrix X may be a term-by-document matrix. In one embodiment, the matrix includes a row for each term extracted from the set of service description documents and a column for each document in the set of service description documents. One way to describe the matrix X is that the matrix X is a term-by-document matrix, and a dimension of the matrix X is t number of terms by d number of documents, and a value $x_{i,j}$ in the matrix X represents a frequency or an occurrence of a term i in a document j from the set of service description documents. In a second embodiment, the value $x_{i,j}$ in the matrix X is set to 1 if the term i occurs in document j, or to 0 otherwise.

At step 304, the matrix X is decomposed using SVD. SVD is a conventional process for representing a matrix in a lower dimensional space. SVD is described in Dumais, S. T., Furnas, G. W., Landauer, T. K. and Deerwester, S. (1988), "Using latent semantic analysis to improve information retrieval." In *Proceedings of CHI'88: Conference on Human Factors in Computing*, New York: ACM, 281-285. SVD takes a matrix and represents it as another matrix in a lower dimensional space such that the "distance" between the two matrices as measured by the 2-norm is minimized.

Decomposing the matrix X using SVD generates three matrices T, S, and $D^t$, wherein S is a diagonal matrix of singular values ordered in descending order, and T and $D^t$ are matrices of eigen vectors of the square symmetric matrices $XX^t$ and $X^tX$ respectively. Furthermore, the square of the singular values are the eigen values for both $XX^t$ and $X^tX$. The dimension of X is t (number of terms) by d (number of documents), while that of T is t-by-m, where m is the rank of X and is at most the minimum of t and d. S is an m-by-m matrix.

At step 305, a top k set of singular values from the matrix S are selected. The top k values, for example, are a set of highest singular values in S. All other singular values in S are set to 0. k is less than the total number of singular values in S and is equal to an integer greater than or equal to 1. A threshold may be used to select the top k values.

The eigen vectors corresponding to the highest eigen values represent principal components that capture the most important characteristics of the data in the matrix X. The eigen values are the singular, non-zero values in the matrix S (i.e., the eigen values are the singular values of the SVD). The contributions keep diminishing for descending eigen values in the matrix S. By dropping some of the lower eigen values and corresponding eigen vectors, some information is lost but the dimensionality of the data is reduced. This is useful when the number of documents is very large. Thus, the top k highest eigen values in the matrix S, and the corresponding eigen vectors in the T and D matrices are kept and the remaining values may be set at zero.

At step 306, a matrix $T_{t \times k}$ containing first k columns of T is determined. t×k means t by k, where t is the number of terms from the matrix X and k is the number of top k eigen values selected at step 305.

At step 307, a matrix $S_{k \times k}$ containing an intersection of the first k rows and the first k columns of S is determined. $S_{k \times k}$ is a square matrix of dimensions k-by-k.

At step 308, a matrix Y comprised of the product of the matrix $T_{t \times k}$ and the matrix $S_{k \times k}$ is determined. The product represents eigen vectors from T weighted by the top K singular values in S.

At step 309, a maximum absolute value for each term in the matrix Y is determined. For example, each row of the matrix determined at step 308 represents a term from the documents 200. A maximum absolute value in each row represents a relevance of a corresponding term for the row.

At step 310, rankings of the terms are determined from the maximum absolute values. For example, the rows of the matrix Y are sorted based on their maximum absolute value. The sorted order of the terms represents the rankings of the terms. For example, 1 is the highest ranking term and has the highest maximum absolute value among all the terms, 2 is the next highest ranking and has the highest maximum absolute value, etc.

At step 311, a vector of the top terms from the list is determined. The top terms are selected based on their maximum absolute values. For example, the terms with maximum absolute values above a threshold are selected. These terms are in the vector in the order determined at step 310.

At step 312, the vector of terms are provided to a search engine to search for candidate service providers on the Internet.

Figure 4:
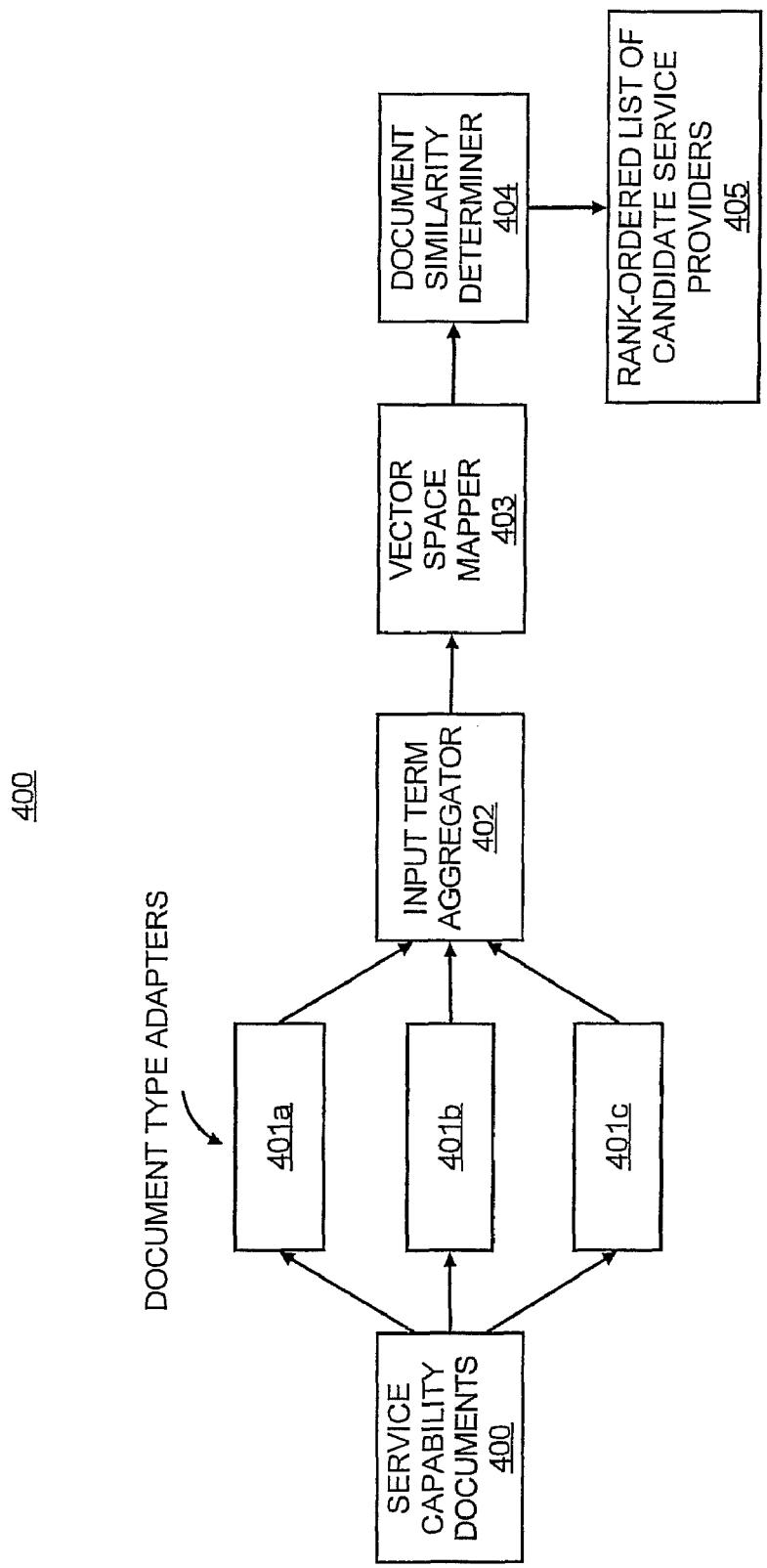
FIG. 4 illustrates a system for matching service capability documents with service requirements in a service description document, according to an embodiment.

FIG. 4 illustrates a system 400 for matching service capability documents with service requirements in a service description document, according to an embodiment. Components of the system may be used in the correlator 130 and the ranker 131 shown in FIG. 1D. The system 400 includes document type adaptors 401a-c, an input term aggregator 402, a vector space mapper 403, and a document similarity determiner 404.

Service capability documents 410 are provided to the document type adaptors 401a-c. The service capability documents 410 include web content found from searching the Internet using the terms extracted from the service description documents 200. The service capability documents 410 are machine readable documents that may exist in different formats, such as HTML, text, PDF, etc. The document type adaptors 401a-c generate normalized representations of the service capability documents 410, such as ASCII text. The input term aggregator 402 reads the normalized documents and combines them into a single data structure, such as a matrix. For example, the matrix is a term-by-document matrix where the rows represent the terms in each of the documents 410 and the columns represent each of the documents 410. Each cell (row, column) then holds a binary value {0,1} indicating that a term occurs in the document or a value indicating the frequency of a term in a document. In another embodiment, the matrix has rows representing the documents and columns representing the terms. The document type adaptors 401a-c and the input term aggregator 402 may be the same as or similar to the document type adaptors 201a-c and the input term aggregator 202.

The vector space mapper 403 maps the service capability documents 410 into a factor space determined from SVD. The document similarity determiner 404 determines the similarity between the service capability documents and a service description document based on a metric The metric may be a distance metric for determining the distance between two vectors in the factor space. A rank-order list of candidate service providers 405 may be determined from the distance metric as described in further detail below in the method 500, which generates a list of ranked candidate service providers based on the similarities of their service descriptions to service requirements. Note that the document similarity determiner 404 may include the ranker 131 shown in FIG. 1D for ranking candidate service providers based on the metric and for generating a list of ranked candidate service providers.

Figure 5:
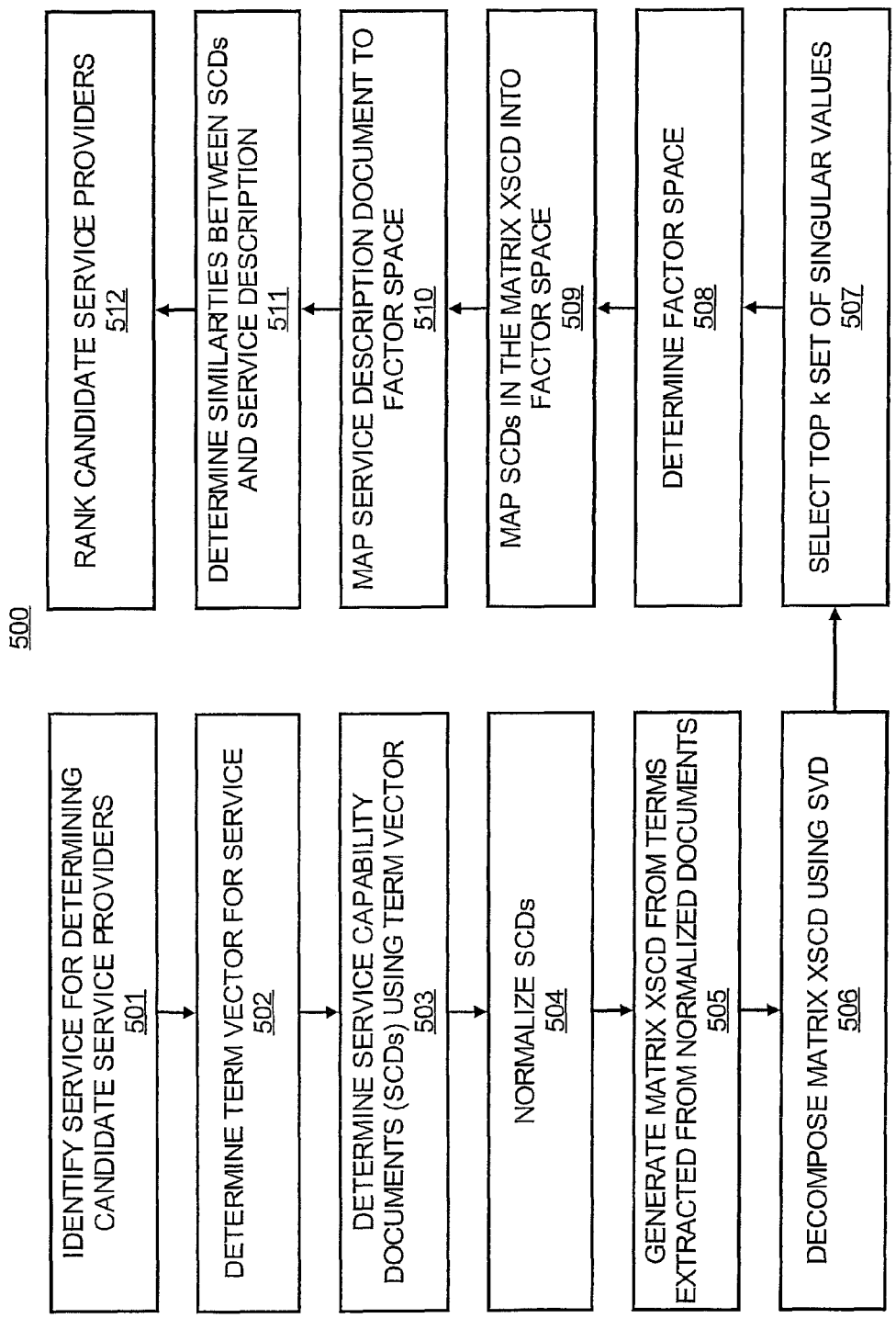
FIG. 5 illustrates a method for determining the similarity between a service description document and service capability documents and ranking service providers based on the similarities, according to an embodiment.

FIG. 5 illustrates a method 500 for determining the similarity between a service description document and service capability documents and ranking service providers based on the similarities, according to an embodiment. The method 500 identifies a subset of the candidate service providers that provide services, as described in service capability documents, matching service requirements of a desired service specified in a service description document. The method 500 is described with respect to one or more of FIGS. 1-4 by way of example and not limitation.

At step 501, a service is identified for determining candidate service providers. This can be a service described in one of the service description documents 200 for which a service provider is sought.

At step 502, a term vector for the service identified at step 501 is determined. The term vector is the terms extracted from the service description document that describes the service requirements. Step 303 of the method 300 describes extracting terms from a service description document.

At step 503, the service capability documents 410 are determined using the term vector from step 502. For example, the following terms are extracted from a SOW for a marketing campaign: "print quantity 2,000 colored 8.5×11 z-fold brochures, 100 lb. gloss within 10 days with maximum budget of $1,000". These terms are input into a search engine, and service capability documents describing services of candidate service providers are determined from the search results.

At step 504, the service capability documents 410 are normalized. The document type adaptors 401a-c are used to normalize documents.

At step 505, a matrix XSCD is generated from terms extracted from the normalized documents 410. For example, the input term aggregator 402 reads the normalized documents and extracts non-stop words. The extracted terms are combined into a single data structure, such as the matrix XSCD. The matrix XSCD is the same as the matrix X described in the method 300, except the matrix XSCD is populated with terms from the service capability documents 410 rather than terms from the service description documents 200. Terms may include single words, bigrams, trigrams, etc. One way to describe the matrix XSCD is that the matrix XSCD is a term-by-document matrix, and a dimension of the matrix XSCD is t number of terms by d number of documents, and a value $x_{i,j}$ in the matrix XSCD represents a frequency or an occurrence of a term i in a document j from the set of service description documents.

At step 506, the matrix XSCD is decomposed using SVD, such as described in step 304 of the method 300. Decomposing the matrix XSCD using SVD generates three matrices T, S, and $D^t$, wherein S is a diagonal matrix of singular values ordered in descending order, and T and $D^t$ are matrices of eigen vectors of the square symmetric matrices XSCD $XSCD^t$ and $XSCD^tXSCD$ respectively. Furthermore, the square of the singular values are the eigen values for both XSCD $XSCD^t$ and $XSCD^tXSCD$. The dimension of XSCD is t (number of terms) by d (number of documents), while that of T is t-by-m, where m is the rank of XSCD $XSCD^t$ and $XSCD^tXSCD$ and is at most the minimum of t and d. S is an m-by-m matrix.

At step 507, a top k set of singular values from the matrix S are selected. Step 507 is the same as step 306, except step 507 is performed for the matrix S generated from the matrix XSCD. The top k values, for example, are a set of highest singular values in S. All other singular values in S are set to 0. k is less than the total number of singular values in S and is equal to an integer greater than or equal to 1. A threshold may be used to select the top k values.

The eigen vectors corresponding to the highest eigen values represent principal components that capture the most important characteristics of the data in the matrix X. The eigen values are the singular, non-zero values in the matrix S. The contributions keep diminishing for descending eigen values in the matrix S. By dropping some of the lower eigen values and corresponding eigen vectors, some information is lost but the dimensionality of the data is reduced. This is useful when the number of documents is very large. Thus, the top k highest eigen values in the matrix S, and the corresponding eigen vectors in the T and D matrices are kept and the remaining values may be set at zero.

At step 508, a factor space is determined for the matrix XSCD. As is known in the art, SVD takes a matrix and represents it as another matrix in a lower dimensional space, referred to as the factor space. SVD projects a t-dimensional space onto a k-dimensional space where t>k. According to the embodiments of the invention, t is the number of terms in XSCD and k is the number of top k values. SVD is used to map a term vector of terms for each service capability document in XSCD into a vector in the k-dimensional factor space.

At step 509, the service capability documents in the matrix XSCD are mapped into the lower-dimension factor space described at step 508 using known mathematical analysis, such as the principal component analysis (PCA) or latent semantic indexing (LSI). The service capability documents are mapped into the factor space by creating the matrix product DS. Each row is a mapping of the corresponding service capability document. The vector space mapper 403 shown in FIG. 4 performs the mappings of each document vector (e.g., each column of XSCD) into the factor space. For example, the matrix product $D_{d \times k} S_{k \times k}$ is determined from XSCD. Each row of this matrix product gives the coordinates of the transform for the corresponding document vector in the factor space. The matrix $S_{k \times k}$ contains an intersection of the first k rows and the first k columns of S, where k is the number of top k values. $S_{k \times k}$ is a square matrix of dimensions k-by-k. The matrix $D_{d \times k}$ is determined from SVD, and d is the number of documents and k is the number of top k values.

At step 510, the term vector determined at step 502 from the service description document is mapped to the factor space. This involves multiplying the transpose of the term vector by a reduced term matrix $T_{t \times k}$. This gives the coordinates of the transform for this term vector in the factor space. The matrix $T_{t \times k}$ contains the first k columns of T determined from the SVD of the matrix XSCD. t×k means t-by-k, where t is the number of terms from the matrix XSCD and k is the number of top k values.

At step 511, the similarities of the service capability documents from step 503 and the service description represented by the term vector from step 502 are determined based on a metric. Now both the service capability documents from step 503 and the service description represented by the term vector from step 502 are mapped to the factor space. The similarities between each of the service capability documents and the term vector can be determined by comparing the mappings in the factor space. In one embodiment, the similarity of a service capability document to the term vector may be measured by a distance metric computed among their coordinates in the factor space. Cosine similarity is a well known metric for measuring the similarity between two vectors of predetermined dimensions by finding the cosine of the angle between the vectors. Given two vectors A and B, the cosine similarity, θ, is the dot product A·B divided by the Euclidean distance between A and B; i.e., A·B/(|A||B|). This ratio defines the cosine angle between the vectors, with values between 0 and 1. As the angle between the vectors shortens, the cosine angle approaches 1, meaning that the two vectors are getting closer and the similarity of the service description and capability documents represented by the vectors increases. The service capability documents from step 509 are ranked based on how close their vectors are to the vector in the factor space for the service description document from step 510. For example, the service capability documents are ranked based on descending values of the cosine similarity. The highest ranked document (one with highest cosine similarity) represents the service with a best chance of satisfying the service requirements of the service description document from step 501.

Instead of cosine similarity other types of distance metrics may be used for determining the similarity of vectors in the factor space. Other metrics may be used to determine document similarities to a term vector for a desired service. Such a metric could be based on the intersection of the terms between the term vectors of the service description and the service capability document of a service provider, or the frequency of the terms in the compared documents and in a large corpus representative of the language.

At step 512, the candidate service providers for the service capability documents are ranked based on the similarity of their corresponding service capability document to the term vector for the service description. In the example described above, the service capability documents are ranked based on descending values of the cosine similarity. The highest ranked document (one with highest cosine similarity) represents the service of a candidate service provider with a best chance of satisfying the service requirements of the service from step 501. A rank-ordered list of candidate service providers may be generated and output to a user. The service described by the highest ranked service capability document may be selected for the desired service. Another highly-ranked service may alternatively be selected.

Figure 6:
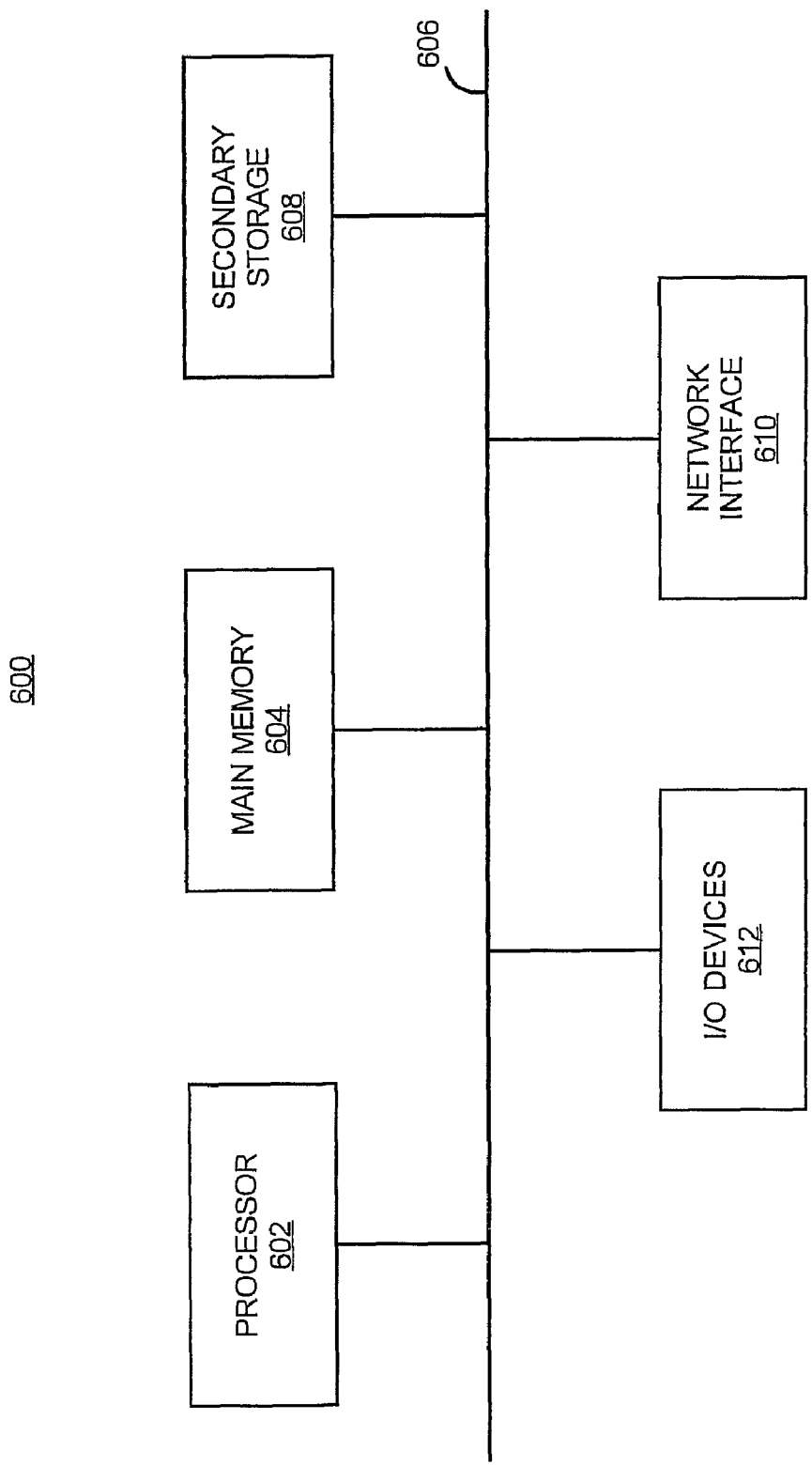
FIG. 6 illustrates a computer system that may be used as a platform for the systems and methods of the embodiments.

FIG. 6 illustrates a block diagram of a general purpose computer system that is operable to be used to execute one or more computer programs implementing the embodiments described herein, including steps described herein. It will be apparent to one of ordinary skill in the art that a more sophisticated computer system is operable to be used. Furthermore, components can be added or removed from the computer system 600 to provide the desired functionality.

The computer system 600 includes one or more processors, such as processor 602, providing an execution platform for executing software. Commands and data from the processor 602 are communicated over a communication bus 606. The computer system 600 also includes computer readable storage mediums including a main memory 604, such as a Random Access Memory (RAM), where software is resident during runtime, and a secondary storage 608. The secondary storage 608 includes, for example, a hard disk drive and/or a removable storage drive representing a floppy diskette drive, a magnetic tape drive, a compact disk drive, etc., or a nonvolatile memory where a copy of the software is stored. In one example, the secondary storage 608 also includes ROM (read only memory), EPROM (erasable, programmable ROM), EEPROM (electrically erasable, programmable ROM). The computer system 600 includes one or more input/output (I/O) devices 612, such as a display, keyboard, a mouse, a stylus, and the like. A network interface 610, wired and/or wireless, is provided for communicating with other computer systems.

One or more of the steps of the methods described herein and other steps described herein and one or more of the components of the systems described herein may be implemented as software code stored on a computer readable medium, such as the memory and/or secondary storage, and executed on a computer system, for example, by a processor. For example, the steps of the embodiments may exist as software program(s) comprised of program instructions in source code, object code, executable code or other formats for performing some of the steps. Any of the above may be embodied on a computer readable medium, which include storage devices. Examples of suitable computer readable storage devices include conventional computer system RAM (random access memory), ROM (read only memory), EPROM (erasable, programmable ROM), EEPROM (electrically erasable, programmable ROM), and magnetic or optical disks or tapes.

While the embodiments have been described with reference to examples, those skilled in the art will be able to make various modifications to the described embodiments without departing from the scope of the claimed embodiments.

What is claimed is:

1. A computer readable medium including code that when executed by a computer system performs a method of determining a ranking of candidate service providers, the method comprising:
   determining terms describing service requirements for a desired service;
   determining service capability documents describing services of candidate service providers using the terms describing the service requirements for the desired service;
   using singular value decomposition (SVD) and a metric to determine similarities between the terms describing the service requirements and the service capability documents; and
   ranking the candidate service providers based on the similarities.

2. The computer readable medium of claim 1, wherein using SVD and a metric to determine similarities between the terms describing the service requirements and the service capability documents further comprises:
   determining a term-by-document matrix from the service capability documents, wherein a dimension of the matrix is t number of terms by d number of documents;
   using SVD to determine matrices T, S, and $D^t$, wherein S is a diagonal matrix of singular values ordered in descending order, and T and $D^t$ are matrices of eigen vectors; and
   selecting top k singular values from S, wherein k is a number of the top k singular values;
   determining a matrix $T_{t \times k}$ containing first k columns of T; and
   determining a matrix $S_{k \times k}$ containing an intersection of the first k rows and the first k columns of S.

3. The computer readable medium of claim 2, wherein using SVD and a metric to determine similarities between the terms describing the service requirements and the service capability documents further comprises:
   determining a vector of terms for each of the service capability documents from the matrix;
   determining a vector of terms from the terms describing the service requirements;
   mapping the vector of terms for each of the service capability documents by determining a product of D and S, wherein individual rows of the product of D and S are the mappings; and
   mapping the vector of terms for the service requirements to a factor space by multiplying its transpose by the matrix $T_{t \times k}$.

4. The computer readable medium of claim 3, wherein using SVD and a metric to determine similarities between the terms describing the service requirements and the service capability documents the method further comprises:
   using the metric to compare the mapped vectors of each of the service capability documents to the mapped vector for the term vector including the terms describing the service requirements; and
   based on the comparisons, determining the similarities between the terms describing the service requirements and the service capability documents.

5. The computer readable medium of claim 4, wherein the metric is a distance metric used to measure distances between the vectors in the factor space.

6. The computer readable medium of claim 3, wherein the factor space is a lower dimensional space than a space having a number of dimensions equal to the t number of terms in the matrix and a space having a number of dimensions equal to the d number of documents in the matrix.

7. The computer readable medium of claim 6, wherein the distance metric is cosine similarity.

8. The computer readable medium of claim 1, wherein the metric is associated with frequency of terms.

9. The computer readable medium of claim 1, wherein determining terms describing service requirements for a desired service further comprises:
   receiving a service description document including the service requirements for the desired service; and
   extracting the terms describing the service requirements which are determined to be relevant to the service requirements.

10. The computer readable medium of claim 1, wherein determining service capability documents describing services of candidate service providers further comprises:
    inputting the terms describing the service requirements into an Internet search engine; and determining the service capability documents from search results of the Internet search engine running a query including the terms describing the service requirements.

11. The computer readable medium of claim 10, wherein the method further comprises:
extracting terms from the service capability documents determined to be relevant to describing services of the service capability documents; and
using the extracted terms from the service capability documents and the terms describing the service requirements for the SVD and the ranking of the candidate service providers.

12. The computer readable medium of claim 11, wherein the method further comprises:
normalizing the service capability documents into a single document format prior to the extracting of the terms from the service capability documents; and
using the normalized service capability documents for the extracting of the terms from the service capability documents.

13. A computer readable medium including code that when executed by a computer system performs a method of determining a ranking of candidate service providers, the method comprising:
determining terms describing service requirements for a desired service;
determining service capability documents describing services of candidate service providers using the terms describing the service requirements for the desired service;
determining a matrix from the terms describing the service requirements and from terms extracted from the service capability documents;
using SVD to decompose the matrix, wherein the matrix decomposed using represents a factor space;
mapping vectors of terms describing the service capability documents and a vector of the terms describing the service requirements to the factor space;
determining similarities between each of the service capability documents and the service requirements based on a metric associated with the mapped vectors; and
ranking the candidate service providers based on the similarities.

14. The computer readable medium of claim 13, wherein is a term-by-document matrix and a dimension of the matrix is t number of terms by d number of documents, the method further comprising:
using SVD to determine matrices T, S, and $D^t$, wherein S is a diagonal matrix of singular values ordered in descending order, and T and $D^t$ are matrices of eigen vectors; and
selecting top k singular values from S, wherein k is a number of the top k singular values;
determining a matrix $T_{t \times k}$ containing first k columns of T; and
determining a matrix $S_{k \times k}$ containing an intersection of the first k rows and the first k columns of S.

15. The computer readable medium of claim 14, wherein mapping vectors of terms further comprises:
mapping the vector of terms for each of the service capability documents by determining a product of D and S, wherein individual rows of the product of D and S are the mappings; and
mapping the vector of terms for the service requirements to a factor space by multiplying its transpose by the matrix $T_{t \times k}$.

16. The computer readable medium of claim 13, wherein the metric is a distance metric used to measure distances between the vectors in the factor space.

17. The computer readable medium of claim 16, wherein the distance metric is cosine similarity.

18. The computer readable medium of claim 13, wherein the factor space is a lower dimensional space than a space having a number of dimensions equal to the t number of terms in the matrix and a space having a number of dimensions equal to the d number of documents in the matrix.

19. A computer system comprising:
an interface receiving a set of service description documents; and
one or more processors executing code to perform a method including
determining terms describing service requirements for a desired service, wherein the service capability documents describe services of candidate service providers and were identified using the terms describing the service requirements for the desired service;
using singular value decomposition (SVD) and a metric to determine similarities between the terms describing the service requirements and the service capability documents; and
ranking the candidate service providers based on the similarities.

20. The computer system of claim 19, wherein using singular value decomposition (SVD) and a metric to determine similarities between the terms describing the service requirements and the service capability documents further comprises:
determining a matrix from the terms describing the service requirements and from terms extracted from the service capability documents;
using SVD to decompose the matrix, wherein the matrix decomposed using represents a factor space; and
mapping vectors of terms describing the service capability documents and a vector of the terms describing the service requirements to the factor space, wherein the similarities between the terms describing the service requirements and the service capability documents is determined from a comparison of the mapped vectors using the metric.

* * * * *

UNITED STATES PATENT AND TRADEMARK OFFICE
CERTIFICATE OF CORRECTION

PATENT NO. : 8,185,536 B2
APPLICATION NO. : 12/363698
DATED : May 22, 2012
INVENTOR(S) : Sujoy Basu et al.

It is certified that error appears in the above-identified patent and that said Letters Patent is hereby corrected as shown below:

In the Claims:

In column 11, line 45, in Claim 14, after "wherein" delete "is".

Signed and Sealed this
Fourth Day of June, 2013

Teresa Stanek Rea
*Acting Director of the United States Patent and Trademark Office*